(12) United States Patent
Shayesteh et al.

(10) Patent No.: US 10,949,341 B2
(45) Date of Patent: Mar. 16, 2021

(54) IMPLEMENTING SNAPSHOT AND OTHER FUNCTIONALITY IN KVSSD THROUGH GARBAGE COLLECTION AND FTL

(71) Applicant: Samsung Electronics Co., Ltd., Suwon-si (KR)

(72) Inventors: Anahita Shayesteh, Los Altos, CA (US); Jingpei Yang, San Jose, CA (US); Vijay Balakrishnan, Mountain View, CA (US)

(73) Assignee: SAMSUNG ELECTRONICS CO., LTD.

( * ) Notice: Subject to any disclaimer, the term of this patent is extended or adjusted under 35 U.S.C. 154(b) by 36 days.

(21) Appl. No.: 16/178,569

(22) Filed: Nov. 1, 2018

(65) Prior Publication Data
US 2020/0065239 A1  Feb. 27, 2020

Related U.S. Application Data (60) Provisional application No. 62/723,472, filed on Aug. 27, 2018.

(51) Int. Cl.
*G06F 3/00* (2006.01)
*G06F 12/02* (2006.01)
*G06F 3/06* (2006.01)
*G06F 16/901* (2019.01)

(52) U.S. Cl.
CPC .......... *G06F 12/0246* (2013.01); *G06F 3/064* (2013.01); *G06F 3/0608* (2013.01); *G06F 3/0679* (2013.01); *G06F 12/0253* (2013.01); *G06F 16/901* (2019.01); *G06F 2212/7201* (2013.01); *G06F 2212/7205* (2013.01)

(58) Field of Classification Search
None
See application file for complete search history.

(56) References Cited

U.S. PATENT DOCUMENTS

| 9,075,710 | B2 | 7/2015 | Talagala et al. | |
|---|---|---|---|---|
| 9,141,670 | B2 | 9/2015 | Branscome et al. | |
| 9,754,005 | B2 | 9/2017 | Potter et al. | |
| 2012/0303866 | A1* | 11/2012 | Bandic .................. | G11B 5/012 711/103 |
| 2016/0299688 | A1* | 10/2016 | Devendrappa .......... | G06F 3/061 |
| 2017/0351543 | A1 | 12/2017 | Kimura | |
| 2019/0087130 | A1* | 3/2019 | Lee ....................... | G06F 3/0659 |

OTHER PUBLICATIONS

Snapshots in a Flash with ioSnap, Apr. 12-16, 2014, http://research.cs.wisc.edu/adsl/Publicationstsnap-euro14.pdf.
Wikipedia article on RocksDB, Oct. 9, 2018, https://en.wikipedia.org/wiki/RocksDB.

* cited by examiner

*Primary Examiner* — Midys Rojas
(74) *Attorney, Agent, or Firm* — Renaissance IP Law Group LLP (57) ABSTRACT

According to one general aspect, an apparatus may include a storage memory to store a plurality of key-value pairs. The apparatus may include at least one snapshot counter configured to store an operation number associated with a respective snapshot of the plurality of key-value pairs. The apparatus may include a snapshot data structure configured to identify, for at least one key-value pair, which, if any, snapshot(s) the respective key-value pair is associated with.

20 Claims, 5 Drawing Sheets

FIG. 2A

| Addr 201 | Key 202 | Value 204 | Valid 206 |
|---|---|---|---|
| 0001 | K0 | V0 | 1 -> 0 |
| 0002 | K1 | V1 | 1 -> 0 |
| 0003 | K2 | V2 | 1 |
| 0004 | K3 | V3 | 1 |
| 0005 | K0 | V0' | 1 -> 0 |
| 0006 | K1 | V1' | 1 |
| 0007 | K0 | V0'' | 1 |
| 0008 | | | |

Table 200:

| Addr 201 | Key 202 | Value 204 |
|---|---|---|
| 0001 | K0 | V0 |
| 0002 | K1 | V1 |
| 0003 | K2 | V2 |
| 0004 | K3 | V3 |
| 0005 | K0 | V0' |
| 0006 | K1 | V1' |
| 0007 | K0 | V0'' |

Table 290:

| Op Num 252 | Cur/Vld 254 | S1 BM 256 | S2 BM 257 | Spr BM 258 |
|---|---|---|---|---|
| O0 | 1 -> 0 | 1 -> 0 | 0 | 1 -> 0 |
| O1 | 1 -> 0 | 1 -> 0 | 1 | 1 |
| O2 | 1 | 1 -> 0 | 1 | 1 |
| O3 | 1 |  | 1 | 1 |
| O4 | 1 -> 0 |  | 1 | 1 |
| O5 | 1 |  | 0 | 1 |
| O6 | 1 |  | 0 | 1 |

Table 292:

| Snp 260 | Snp Op 262 |
|---|---|
| S1 | O2 |
| S2 | O4 |

IMPLEMENTING SNAPSHOT AND OTHER FUNCTIONALITY IN KVSSD THROUGH GARBAGE COLLECTION AND FTL

CROSS-REFERENCE TO RELATED APPLICATION

This application claims priority under 35 U.S.C. § 119 to Provisional Patent Application Ser. No. 62/723,472, entitled "IMPLEMENTING SNAPSHOT AND OTHER FUNCTIONALITY IN KVSSD THROUGH GARBAGE COLLECTION AND FTL" filed on Aug. 27, 2018. The subject matter of this earlier filed application is hereby incorporated by reference.

TECHNICAL FIELD

This description relates to data storage, and more specifically to implementing snapshot and other functionality in Key-Value Solid-State Devices (KVSSD) through garbage collection and Flash Translation Layer (FTL).

BACKGROUND

A key-value database, or key-value store, is a data storage paradigm designed for storing, retrieving, and managing associative arrays, a data structure more commonly known today as a dictionary or hash table. Key-value databases work in a very different fashion from the better known relational databases (RDB). RDBs pre-define the data structure in the database as a series of tables containing fields with well defined data types. In contrast, key-value systems treat the data as a single opaque collection, which may have different fields for every record. Generally, key-value databases are stored in solid state devices (SSDs) using programming layers (e.g., RocksDB) that are operated by the central processing unit (CPU).

A solid-state drive (SSD) is a solid-state storage device that uses integrated circuit assemblies as memory to store data persistently. It is also sometimes called solid-state disk, although SSDs do not have physical disks. Most SSD manufacturers use non-volatile NAND flash memory in the construction of their SSDs because of the lower cost.

Generally, SSDs are notable for the way they read and write data. Often, a block of data stored on a flash memory chip must be electrically erased before new data can be written, or programmed, to the solid-state drive. The SSD write cycle is also known as the program/erase (P/E) cycle.

When an SSD is new, all of the blocks are erased and new, incoming data is directly written to the flash media. Once the SSD has filled all of the free blocks in a section of the flash storage media, it must erase previously programmed blocks to make room for new data to be written. Blocks that contain valid, invalid or unnecessary data are copied to different blocks, freeing the old blocks to be erased. The SSD controller periodically erases the invalidated blocks and returns them into the free block pool.

The background process an SSD uses to clean out the unnecessary blocks and make room for new data is called garbage collection. The garbage collection process is generally invisible to the user, and the programming process is often identified simply as a write cycle, rather than a write/erase or P/E cycle.

SUMMARY

According to one general aspect, an apparatus may include a storage memory to store a plurality of key-value pairs. The apparatus may include at least one snapshot counter configured to store an operation number associated with a respective snapshot of the plurality of key-value pairs. The apparatus may include a snapshot data structure configured to identify, for at least one key-value pair, which, if any, snapshot(s) the respective key-value pair is associated with.

According to another general aspect, an apparatus may include a storage device. The storage device may include a flash translation layer (FTL) circuit configured to: cause data to be stored in key-value pairs, and associate, upon request, a set of key-value pairs with a snapshot. The storage device may include a storage memory configured to: store a plurality of key-value data pairs, and store a snapshot data structure that identifies, for at least one key-value pair, which, if any, snapshot(s) the respective key-value pair is associated with. The storage device may include a snapshot counter configured to store an operation number associated with a respective snapshot.

According to another general aspect, a system may include a processor configured to: write and read data in key-value pairs, and manipulate snapshots of sets of the key-value pairs. The system may include a memory storage device. The memory storage device may include a flash translation layer (FTL) circuit configured to: cause data to be stored in key-value pairs, and associate, upon request, a set of key-value pairs with a snapshot. The storage device may include a storage memory configured to: store a plurality of key-value data pairs, and store a snapshot data structure that identifies, for each key-value pair, which, if any, snapshot(s) the respective key-value pair is associated with. In such a system, in response to the processor requesting the creation of a snapshot: the flash translation layer (FTL) circuit stores a most recent operation number in a snapshot counter; and the snapshot data structure sets a bitmap for a most recent key-value pair associated with each key in the set of key-value pairs, and wherein the bitmap indicates if the key-value pair may be garbage collected.

The details of one or more implementations are set forth in the accompanying drawings and the description below. Other features will be apparent from the description and drawings, and from the claims.

A system and/or method for data storage, and more specifically to implementing snapshot and other functionality in Key-Value Solid-State Devices (KVSSD) through garbage collection and Flash Translation Layer (FTL), substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1:
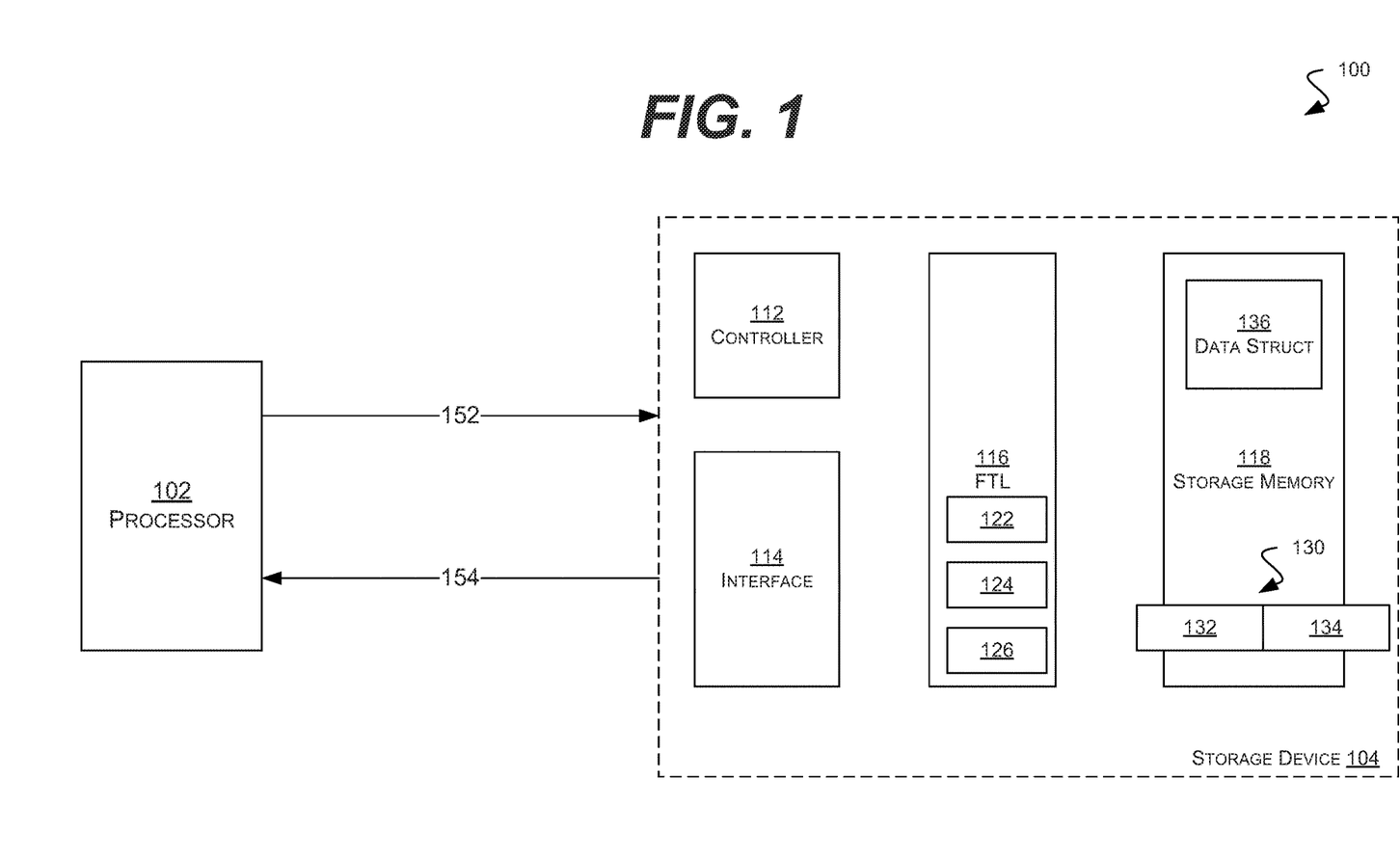
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system 100 may include a computing device, such as, for example, a system-on-a-chip (SoC), laptop, desktop, workstation, personal digital assistant, smartphone, tablet, and other appropriate computers or a virtual machine or virtual computing device thereof. In various embodiments, the system 100 may be used by a user (not shown).

In various embodiments, the system 100 may include a processor 102 configured to execute one or more machine executable instructions or pieces of software, firmware, or a combination thereof. As described below, the processor 102 may be configured to write and read data to/from the storage device 104.

The system 100 may include, in some embodiments, a memory (e.g., storage device 104) configured to store one or more pieces of data, either temporarily, permanently, semi-permanently, or a combination thereof. Further, the storage device 104 may include volatile memory, non-volatile memory or a combination thereof. In various embodiments, the storage medium or device 104 may be configured to store data in a semi-permanent or substantially permanent form. In some embodiments, the storage device 104 may include a sold-state device or Flash memory.

In various embodiments, the storage device 104 may include a controller 112 to manage or control the local data storage and memory management. The storage device 104 may include an interface 114 to communicate with the processor 102, memory management unit (MMU), or other memory management circuit (not shown, but represented as the processor 102).

In various embodiments, the storage device 104 may include a flash translation layer (FTL) 116. In such an embodiment, the FTL 116 may manage the data stored on flash memory (i.e. storage memory 118). In various embodiments, this may involve mapping host side or file system logical block addresses (LBAs) to the physical address of the storage memory 118 (logical-to-physical mapping), performing wear leveling and other Flash management, such as, for example, bad block management, read disturb management, safe flash handling.

The FTL 116 may also perform garbage collection (via garbage collector circuit 122). Occasionally (e.g., when a number of memory blocks have been written one time), the FTL 116 may need to erase to some of the memory blocks which no longer have current data (also called stale blocks). The data in these blocks may be replaced with newly written blocks and now the invalid data stored in those blocks may be waiting to be erased, so new, valid data may be stored there.

The storage device 104 may include a storage memory 118 to store data. The storage memory 118 may include non-volatile memory cells arranged in blocks; although, it is understood that the above is merely one illustrative example to which the disclosed subject matter is not limited.

In the illustrated embodiment, the storage device 104 may be configured to store data in pairs of data represented as keys 132 and values 134. In such an embodiment, the key-value pairs 130 may be searchable, indexable, or accessible by the key 132 and the value 134 may represent that data associated with the key 132. In some embodiments, the value 134 may include one piece of data, whereas in another embodiment, the value 134 may include a data structure that includes a plurality of pieces of data. It is understood that the above are merely a few illustrative examples to which the disclosed subject matter is not limited.

The processor 102 may issue read, write or memory management commands or requests 152 (collectively memory access requests or modify operations). In various embodiments, a write command may be referred to as Put( ); a read command as a Get( ); and a delete, remove, or erase command as a Delete( ). It is understood that the above are merely a few illustrative examples to which the disclosed subject matter is not limited. In the illustrated embodiment, each memory access command or request 152 may reference a key 132 to which the command 152 applies. In such an embodiment, the FTL 116 may determine which key-value pair 130 is associated with the proper key and perform the requested action (write, read, delete, etc.).

In response the storage device 104 may respond via the memory access response messages 154. In various embodiments, this memory access response 154 may indicate if the write or deletion was successful or which the desired data.

Occasionally, it may be useful to take a snapshot of a set of data or key-value pairs 130 for later use. Generally, only the most recent copy or version of a key-value pair 130 is kept or treated as valid. As a new value 134 associated with a particular key 132 is written to the storage memory 118, the old value 138 (or since they are stored as key-value pairs 130 the whole pair 130) is marked as invalid and conceptually erased (even though the actual garbage collection activity of physically erasing the old pair 130 may occur much later).

But, with a snapshot, all the key-value pairs 130 that are valid when the snapshot is taken are tagged and protected against future deletion. This allows the data set to be changed (i.e., pairs 130 deleted or altered) and if a user decides something went wrong the old, snapshotted, or frozen version of the dataset can be retrieved, as if the changes since the snapshot never happened. This is very useful for maintaining historical versions of data (e.g., for auditing purposes), experimenting with data changes or generally backing up data. The same concept (although accomplished via a different technique) is commonly used for version control of source code development.

Traditionally, a storage device 104 is not able to natively accommodate snapshotting. Traditionally, a software layer executed by the processor 102 manipulates the memory access requests 152 to add that functionality to the kay-value database. However, in the illustrated embodiment, the storage device 104 and FTL 116 are able to natively provide this ability.

In the illustrated embodiment, the FTL 116 may include a snapshot manager circuit 124 to process any memory access commands 152 related to snapshots and to handle non-snapshot memory access commands 152 is a way that accommodates the ability to store snapshots. One of the major modifications snapshot storage may impose on the storage device 104 is the alteration of garbage collection. In such an embodiment, the garbage collection circuit 122 may not be able to just erase any data that is no longer valid or the most recent version of the key's 132 pair 130.

In the illustrated embodiment, to accomplish this the storage device 104 or the FTL 116 may require that each memory access request 152 include or be assigned by the storage device 104 a semi-unique identifying (ID) number. In such an embodiment, the FTL 116 may include one or more snapshot counter circuits 126 that associate each snapshot with one or more operation numbers. How these snapshot counter circuits 126 use these operation numbers is described more fully in reference to FIG. 2B.

In the illustrated embodiment, the storage device 104 may include a snapshot data structure 136 to identify, for each key-value pair, which, if any, snapshot(s) the respective key-value pair is associated with. In various embodiments, this snapshot data structure 136 may be included in the storage memory 118. In another embodiment (not illustrated), the snapshot data structure 136 may be included in a separate memory or even the FTL 116. It is understood that the above are merely a few illustrative examples to which the disclosed subject matter is not limited.

Figure 2A:
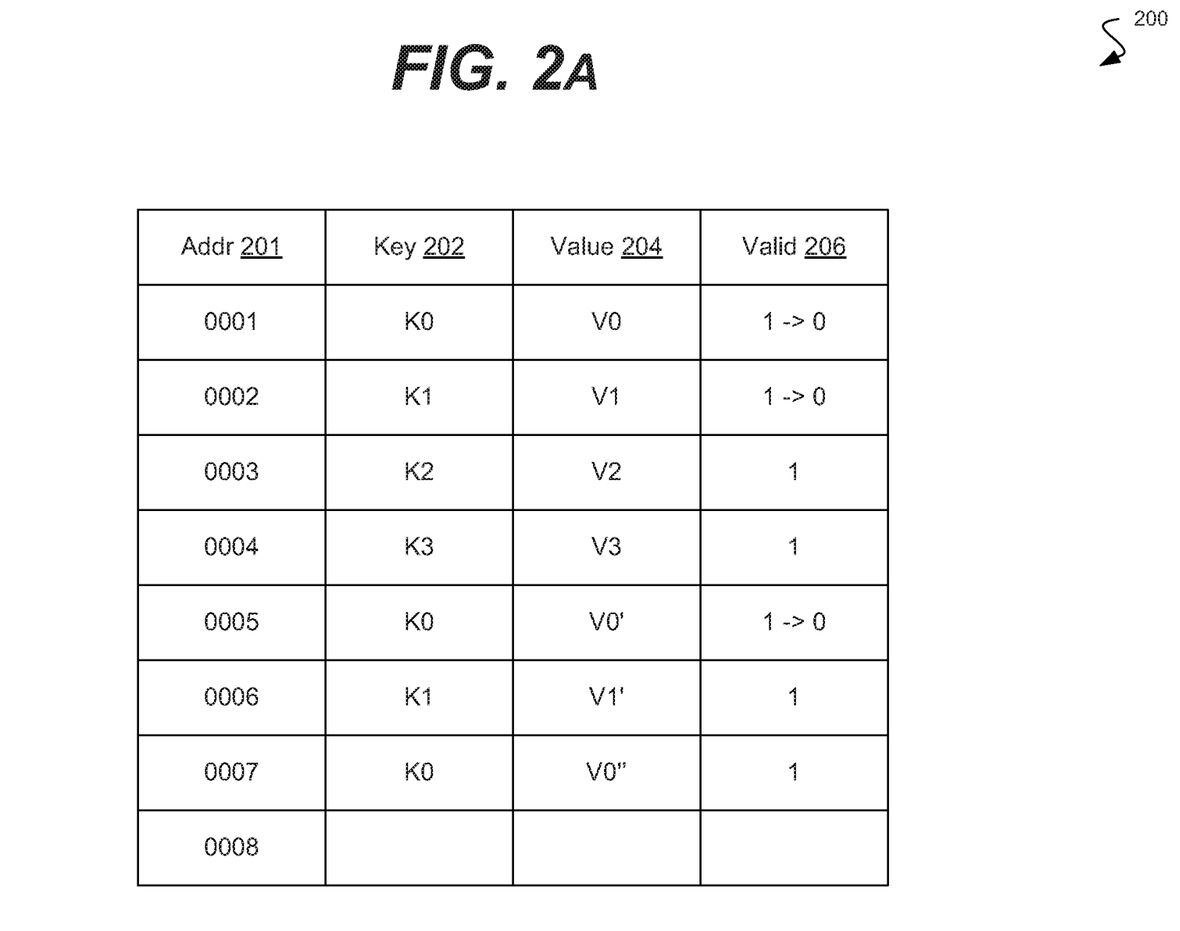
FIG. 2A is a block diagram of an example embodiment of a data structure in accordance with the disclosed subject matter.

FIG. 2A is a block diagram of an example embodiment of a data structure 200 in accordance with the disclosed subject matter. The data structure 200 illustrates how data may be stored in the storage memory, in one embodiment.

In various embodiments, the storage memory may store key-value pairs at memory addresses 201. In the illustrated embodiment, each key-value pair may be indexed or addressable by its key 202 and the data stored may be the value 204. As described above, the value 204 may include one piece of data or a larger data structure. Each memory address 201 may be associated with a valid bit 206 that indicates if the data stored therein is good or not. In this context, the valid bit 206 may indicate if the data stored therein is the most recent version of the key-value pair.

In the illustrated embodiment, the following set of memory access operations, specifically writes or Put( ) requests may be performed in the following order.

First, the Put(K0, V0) command may occur and the key K0 and the value V0 may be stored at address 0001. The valid bit 206 for the memory address may be set to 1 to indicate that the data in that memory address is good or valid and can be read.

Second, the Put(K1, V1) command may occur and the key K1 and the value V1 may be stored at address 0002. In this embodiment, the data will be stored sequentially, but it is understood that this is merely one illustrative example to which the disclosed subject matter is not limited. The valid bit 206 for the memory address may be set to 1 to indicate that the data in that memory address is good or valid and can be read.

Third, the Put(K2, V2) command may occur and the key K2 and the value V2 may be stored at address 0003. The valid bit 206 for the memory address may be set to 1 to indicate that the data in that memory address is good or valid and can be read.

Fourth, the Put(K3, V3) command may occur and the key K3 and the value V3 may be stored at address 0004. The valid bit 206 for the memory address may be set to 1 to indicate that the data in that memory address is good or valid and can be read.

So far, in the illustrated embodiment, only new keys have been stored in the system. No conflicts have occurred and everything may be stored in new blocks without any conflicts or interesting occurrences.

However, the fifth command may include the Put(K0, V0') command. Which is to the pre-existing key K0 but with new value data V0'. As SSDs do not generally immediately overwrite previously stored data, they merely invalidate the data and at a future time (e.g., during a period of inactivity) garbage collect or erase the invalid data, the new value V0' (and hence new version of the key-value pair) may be written to a new memory location. The key K0 and the new value V0' may be stored at address 0005. The valid bit 206 for the memory address 0005 may be set to 1 to indicate that the data in that memory address is good or valid and can be read. Also, the valid bit 206 for the memory address 0001 may be set to 0 to indicate that the data in that memory address is old or invalid and cannot be read (and may be garbage collected).

The sixth command may include the Put(K1, V1') command. Similar to that described above, the new version of the K1 key-value pair may be stored in address 0006. The valid bit 206 for address 0006 may be set to 1 and the valid bit for address 0002 may be cleared to 0.

The seventh command may include the Put(K0, V0") command. Similar to that described above, the newest version of the K0 key-value pair may be stored in address 0007. The valid bit 206 for address 0007 may be set to 1 and the valid bit for address 0005 may be cleared to 0.

In such an embodiment, one can see how a series of write or Put( ) commands may create a series of key-value pairs, with a number of invalid or older versions of the certain, "overwritten" keys continuing to be stored in the memory. As described above, eventually garbage collection may occur and these invalid key-value pairs may be erased. Then their memory addresses may be reused for future key-value pairs. The disclosed subject matter may operate this way when snapshots are not being used. However, if one wished to keep the old version of the K1 key-value pair in memory address 0002, such a technique would not be able to accommodate that.

Figure 2B:
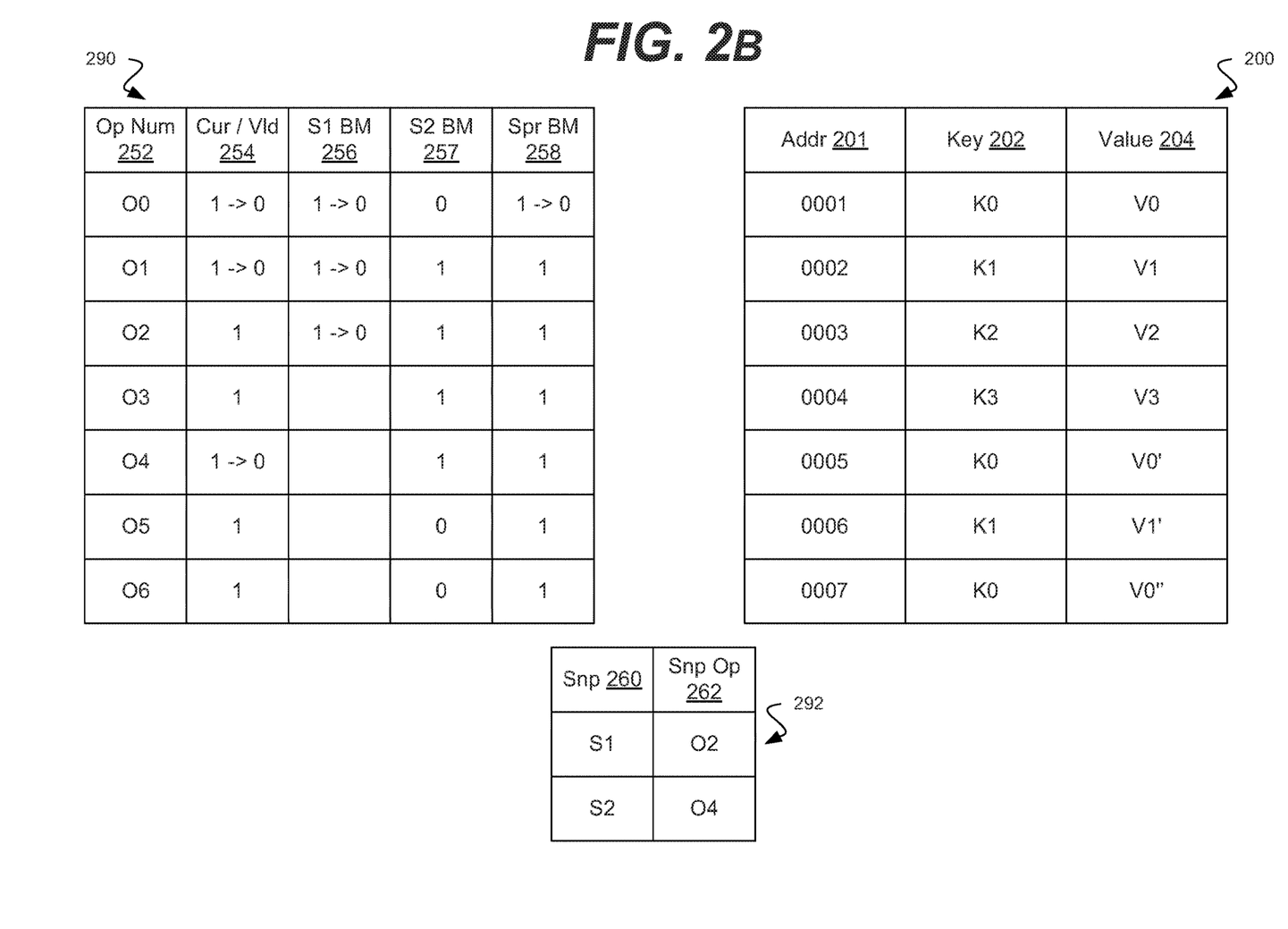
FIG. 2b is a block diagram of an example embodiment of a system of data structures in accordance with the disclosed subject matter.

FIG. 2b is a block diagram of an example embodiment of a system of data structures 200, 290, and 292 in accordance with the disclosed subject matter. The data structures 200, 292 and 294 illustrate how data may be stored in the storage memory in such a way as to accommodate snapshot functionality and garbage collection, in one embodiment.

In the illustrated embodiment, the key-value pairs may be stored in the data structure 200, as described above. Furthermore, the key-value pairs may be stored in substantially the same way as described in reference to FIG. 2A, although, additional memory operations will be added.

Also, in the illustrated embodiment, the snapshot data structure 290 is shown. In various embodiments, the snapshot data structure 290 may identify, for each key-value pair, which, if any, snapshot(s) the respective key-value pair is associated with (e.g., is valid in). Further, the snapshot data structure 290 may manage and control garbage collection such that preserved data (which is included in a snapshot) is not prematurely erased.

In the illustrated embodiment, the snapshot data structure 290 may include a column for the operation number 252, a column for the current or valid flag or bit 254, a column for each snapshot flag or bitmap 256 and 257, and a super flag or bitmap 258 that indicates whether the data may be subject to garbage collection.

In the illustrated embodiment, the snapshot counters 292 are also shown. In various embodiments, the snapshot counters 292 may store an operation number associated with a respective snapshot of a set of the key-value pairs stored in the memory or data structure 200. In the illustrated embodiment, the snapshot counters 292 may include a column or field for each snapshot's name or number 260, and a column or field indicating the operation number 262 associated with the snapshot.

In the illustrated embodiment, two snapshots are shown. It is understood that the above is merely one illustrative example to which the disclosed subject matter is not limited. In various embodiments, the number of possible snapshots may be limited by the number of snapshot counters 292 or relevant columns in the snapshot data structure 290. In another embodiment, the number of possible snapshots may be effectively unlimited or dynamically adjustable based upon an allocation of memory resources.

In various embodiments, the snapshot counters 292 and/or the snapshot data structure 290 may be stored within the main storage memory, as the data structure 200. In some embodiments, the columns of the snapshot data structure 290 may be integrated with the key-value pair data structure 200. In other embodiments, these data structures 200, 290, and 292 may be separate and/or involve different hardware. In various embodiments, the data structures 200 and/or 290 may be stored associated with the FTL. In such an embodiment, the data structure 290 may be integrated with key-value (KV) pairs, or stored in metadata area in the device. In some embodiments, the data structure 292 could be stored in SSD memory and flushed to hardware periodically, or treated as a special type of key-value pair, where 'key' is the snapshot id, 'value' is the 'snp op' 262. It is understood that the above are merely a few illustrative examples to which the disclosed subject matter is not limited.

In the illustrated embodiment, each write or non-snapshot related memory operation (e.g., a Put( )) may be assigned or associated with a sequential operation number or identifier (ID). In various embodiments, this operation number may be assigned by the processor or requesting circuit. In another embodiment, the operation number may be assigned by the FTL or the storage device itself (e.g., by a counter circuit). The operation number may be sequential or monastically increasing, if not contiguous, such that it is possible to tell which order a series of memory operations occurred.

In such an embodiment, the series of operations may be:

| Time: 0 | Operation Number: O0 | Command: Put(K0, V0) |
|---|---|---|
| Time: 1 | Operation Number: O1 | Command: Put(K1, V1) |
| Time: 2 | Operation Number: O2 | Command: Put(K2, V2) |
| Time: 3 | Operation Number: | Command: Create(S1) |
| Time: 4 | Operation Number: O3 | Command: Put(K3, V3) |
| Time: 5 | Operation Number: O4 | Command: Put(K0, V0') |
| Time: 6 | Operation Number: | Command: Create(S2) |
| Time: 7 | Operation Number: O5 | Command: Put(K1, V1') |
| Time: 8 | Operation Number: O6 | Command: Put(K0, V0'') |
| Time: 9 | Operation Number: | Command: Get(K0) |
| Time: 10 | Operation Number: | Command: Get(S1, K0) |
| Time: 11 | Operation Number: | Command: Get(S2, K0) |
| Time: 12 | Garbage Collection Occurs | |
| Time: 13 | Operation Number: | Command: Release(S1) |
| Time: 14 | Garbage Collection Occurs | |
| Time: 15 | Operation Number: | Command: Get(S2) |

Similarly to that described above, at Time 1 the write or Put(K0,V0) command is received with the operation number O0. The data is stored at address 0001. But, the operation number associated with the write command is also stored in the operation number field 252 (associated with address 0001). As described above, the current or valid bit 254 for address 0001 is set to 1. At this point the snapshot bitmaps 256 and 257 may be 0 as no snapshots exist at this point. The super bit 258 will be discussed later.

Likewise, similar events may occur as the write commands of Times 1 and 2 occur.

At Time 3 a command to create a snapshot (S1) is received. In various embodiments, it may not be associated with an operation number. Although, in another embodiment, it may be as continuity of the operation numbers need no occur.

In such an embodiment, when the snapshot S1 is created a number of things may happen. The highest or most recent operation number (in this case O2 from the write command of Time 2) is entered into the S1 row of the snapshot operation number field 262 of the snapshot counter. In one embodiment, every key-value pair with valid data (bit 254 being set) is copied to the appropriate bitmap for the snapshot, in this case S1 bitmap 256. Hence, the snapshot S1 bitmap 256 for addresses 0001, 0002, and 0003 are set. In another embodiment, a lazy update method may be employed in which the S1 bitmap 256 is not set or, in some embodiments, even created until a modify operation occurs that causes data held in one snapshot to be invalid (at a current time). In such an embodiment, when the data in address 0001 is updated (e.g., at Time 5) the valid bit 254 may be cleared but then the S1 bitmap 256 may be set. In such an embodiment, the overhead of creating and maintaining the snapshot bitmaps 256 & 257 may be reduced. As detailed below when garage collection is described, this will prevent garbage collection from erasing those key-value pairs (in addresses 0001, 0002, and 0003) even if there data is no longer valid or most current.

At Time 4, the key K3 is storage, as described above.

At Time 5, a new version of key K0 is stored. As described above in reference to FIG. 2A this new key-value pair (K0 and V0') may be stored at address 0005. As described above, in the lazy update embodiment, this is when the S1 bitmap 256 for address 0001 gets populated by current/valid bit 254. In various embodiments, this may be done before the key-value pair (and the valid bit 254) is updated. The valid or current bit 254 for the old K0 key-value pair at address 0001 may be cleared to 0, indicating that it is not longer the most current version of the K0 key-value pair But, as that old K1,V0 pair is preserved as part of snapshot S1, the 0001 bit of the S1 bitmap 256 may remain 1.

At Time 6, the snapshot S2 is created. Again, the highest or most recent operation number (in this case O4 from the write command of Time 5) is entered into the S2 row of the snapshot operation number field 262 of the snapshot counter. Further, in the non-lazy update embodiment, every key-value pair with valid data (bit 254 being set) is copied to the appropriate bitmap for the snapshot, in this case S2 bitmap 257. Hence, the snapshot S7 bitmap 257 for addresses 0002, 0003, 0004, and 0005 are set. Again, in the lazy embodiment, these bits may be updated as new modify operations to the associated key-value pairs occur. As detailed below when garage collection is described, this will prevent garbage collection from erasing those key-value pairs (in addresses 0002, 0003, 0004, and 0005) even if there data is no longer valid or most current.

At Time 7 and Time 8 new values (V1 and V0'') for keys K1 and K0 are stored, as described above. As such the valid or current bits 254 for addresses 0002 and 0005 (the old key-values pairs for K1 and K0) are cleared or marked invalid, but the S1 and S2 bitmaps 256 and 257 are not affected.

At Time 9 a read or Get( ) memory access occurs, requesting the latest version of the K0 key's value. In such an embodiment, the current or valid bit 254 field is examined and it is determined that the key-value pair at address 0007 (K0, V0'') is the most recent. The current or valid bits for addresses 0001 and 0005 being cleared to 0. Hence the value V0'' will be returned to the processor.

At Time 10 a read or Get( ) memory access occurs, requesting not the latest version of the K0 key's value, but the version of the K0 key's value stored as or associated with the snapshot S1. In such an embodiment, the S1 bitmap 256 is checked and it is determined that the key-value pair at address 0001 (K0, V0) is the S1 snapshot version. The S1 bitmap bits 256 for addresses 0005 and 0007 being cleared to 0. Hence the value V0 will be returned to the processor.

At Time 11 a read or Get( ) memory access occurs, requesting not the latest version of the K0 key's value, but the version of the K0 key's value stored as or associated with the snapshot S2. In such an embodiment, the S2 bitmap 257 is checked and it is determined that the key-value pair at address 0005 (K0, V0') is the S2 snapshot version. The S2 bitmap bits 257 for addresses 0001 and 0007 being cleared to 0. Hence the value V0' will be returned to the processor.

At Time 12 garage collection occurs. Traditionally, garbage collection may erase any key-value pairs that are not valid. However, in the illustrated embodiment, the garbage collection circuit may refrain from erasing any key-value pairs that are also part of an active snapshot.

In one such embodiment, the garbage collection circuit may check, for each address in question, to see if the current or valid bit 254 is set, and also check if each snapshot bits 256 and 257 are set. If any of these are set, the garbage collection circuit may refrain from erasing the associated key-value pair. In various embodiments, a super bit 258 may be maintained which is simply the logical OR of the current and valid bits 254 and all snapshot bits (e.g., bits 256 and 257).

In the illustrated embodiment, at Time 12 when the garbage collection runs none of the addresses 0001-0007 may be erased as their respective super bits 258 may all be 1. Which means each key-value pair is either the most current version for that key, or part of a snapshot.

At Time, 13, a command to release or no longer store the snapshot S1 may be received. In such an embodiment, all the bits of the S1 bitmap 256 may be cleared. Likewise, the snapshot operation number field of the counter 292 may be cleared. In various embodiments in which the data structures 290 and 292 are dynamically created, the S1 related columns or rows may be removed. However, in various embodiments in which the data structures 290 and 292 included a fixed number of possible snapshots these columns or row may remain.

At Time 14 another garbage collection may occur. This time, unlike the garbage collection at Time 12 the key-value pair at address 0001 may be neither the most current version nor part of any snapshot (as S2 does not include it, and S1 was deleted). Hence its super bit 258 or the OR of bits 254, 256 and 257 may be equal to 0. Hence, the data stored at address 0001 may be erased.

At Time 15, a request to retrieve all key-value pairs associated with the snapshot S2 is received. In such an embodiment, the storage device may return all key-value pairs having a 1 in the S2 bitmap field 257. As such, addresses 0002, 0003, 0004, and 0005 may be returned to the processor, even though the addresses 0006 and 0007 have more recent versions of keys K1 and K0.

In the illustrated embodiment, it has been shown how through the use of data strictures 290 and 292 and the circuits which maintain and utilize them, the ability to take snapshots of data may be employed in hardware. While the described subject matter has included the use of key-value pairs, it is understood that such is merely one illustrative example of data to which the disclosed subject matter is not limited.

In some embodiments, all of the key-value pairs which are current (the current or valid bit 254) may be conceptually thought of as being in a dynamically created current snapshot. In various embodiments, a snapshot counter 292 may be dedicated to this current snapshot and include the most recent or highest operation number. In such an embodiment, when a new snapshot is created the value from the current snapshot's operation number field 262 may just be copied to the named (e.g., S1 or S2) snapshot's operation number field 262.

In various embodiments, the data structure 290 may include columns to support a time-to-live (TTL) field to allow key-value pairs to be valid for only a certain period of time. In another embodiment, the data structure 290 may be able to merge two or more snapshots to create a third snapshot using the columns 256 and 257. In yet another embodiment, the data structure 290 may be leveraged to aid in compacting, sorting, or re-ordering key-value pairs. In such an embodiment, the data structure 290 may include a separate order index or metadata column (not shown). It is understood that the above are merely a few illustrative examples to which the disclosed subject matter is not limited.

Figure 3:
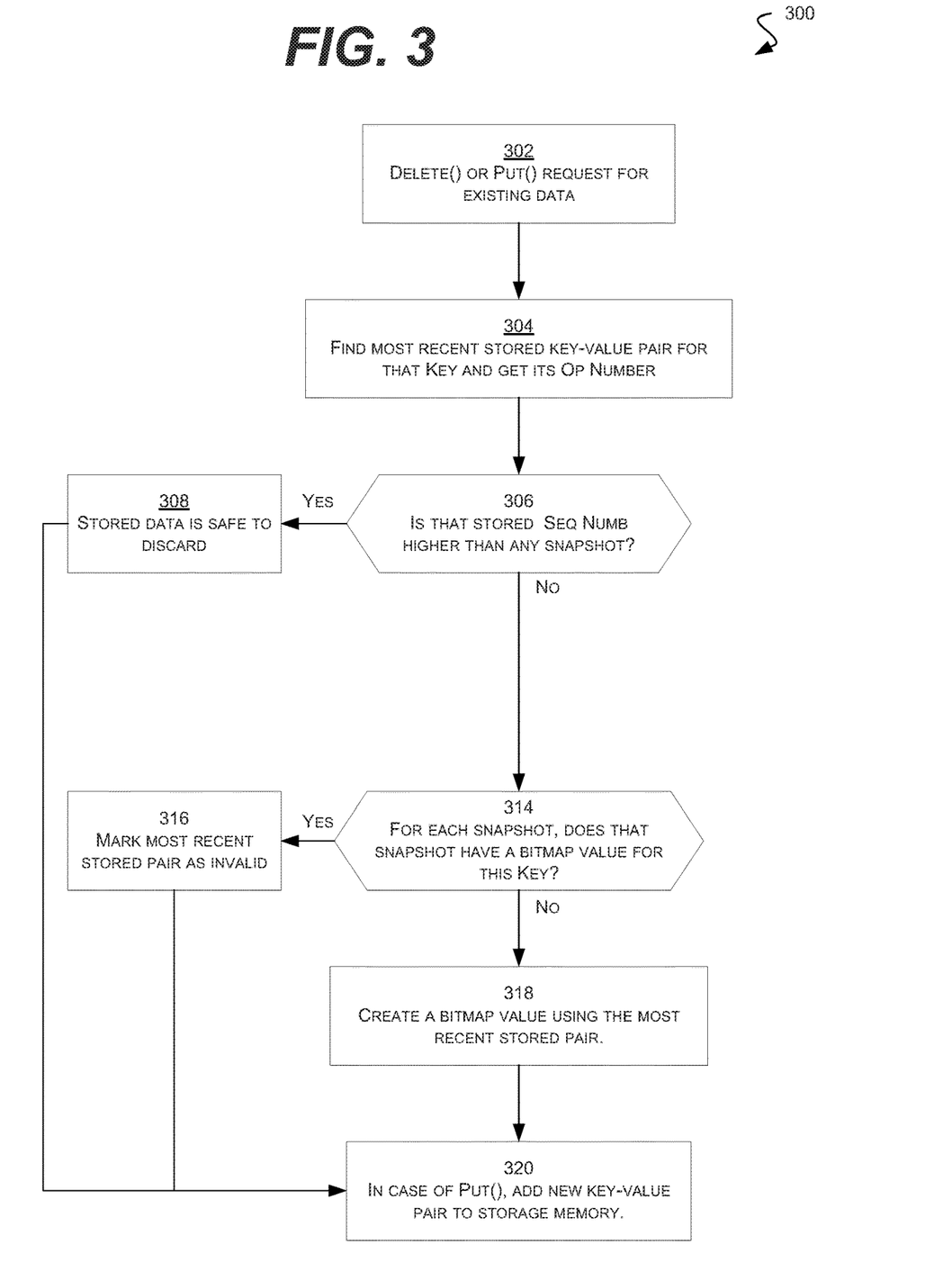
FIG. 3 is a flowchart of an example embodiment of a technique in accordance with the disclosed subject matter.

FIG. 3 is a flowchart of an example embodiment of a technique 300 in accordance with the disclosed subject matter. In the illustrated embodiment, the technique 300 shows what may occur when a write or removal memory operation occurs. In such an embodiment, the timing of the setting of the bitmaps and fields may differ from that described above in relation to FIG. 2B. Similarly, a read memory operation may include timings that differ from those described in relation to FIG. 2B.

Block 302 illustrates that, in one embodiment, write or removal memory operation (e.g., Delete( ) or Put( )) may be received that involves a pre-existing key (e.g., as occurred at Times 5, 7, and 8 in FIG. 2B).

Block 304 illustrates that, in one embodiment, that the most recently stored key-value pair for the respective key may be found, and its operation number retrieved. This is not to be confused with the new key-value pair associated with the write operation, which has not yet been stored.

Block 306 illustrates that, in one embodiment, that that most recently stored operation number may be compared to the operation numbers associated with the various snapshots.

Block 308 illustrates that, in one embodiment, if the most recently stored operation number is not associated with any snapshot (e.g., higher than the snapshot's operation numbers), the most recently stored is safe to discard and may be replaced with the key-value pair of the write operation or merely deleted. In various embodiments, this may include marking the if the most recently stored key-value pair version as invalid and available for garbage collection.

Block 314 illustrates that, in one embodiment, if the most recently stored operation number is associated with at least one snapshot, for each snapshot a determination may be made as to whether or not the snapshot includes or is associated with a bitmap value for this particular key.

Block 316 illustrates that, in one embodiment, if any snapshot includes or is associated with a bitmap value for this particular key, the most recently stored key-value pair may be marked as invalid, but may not be marked as being allowed to be garbage collected.

Block 318 illustrates that, in one embodiment, if no snapshot—specifically the most recent snapshot—includes or is associated with a bitmap value for this particular key, the most recently stored key-value pair may be included in the most recent snapshot's bitmap.

Block 320 illustrates that, in one embodiment, if the command from Block 302 was a write or Put( ) operation, the new key-value pair may be added to the storage memory, as described above.

Figure 4:
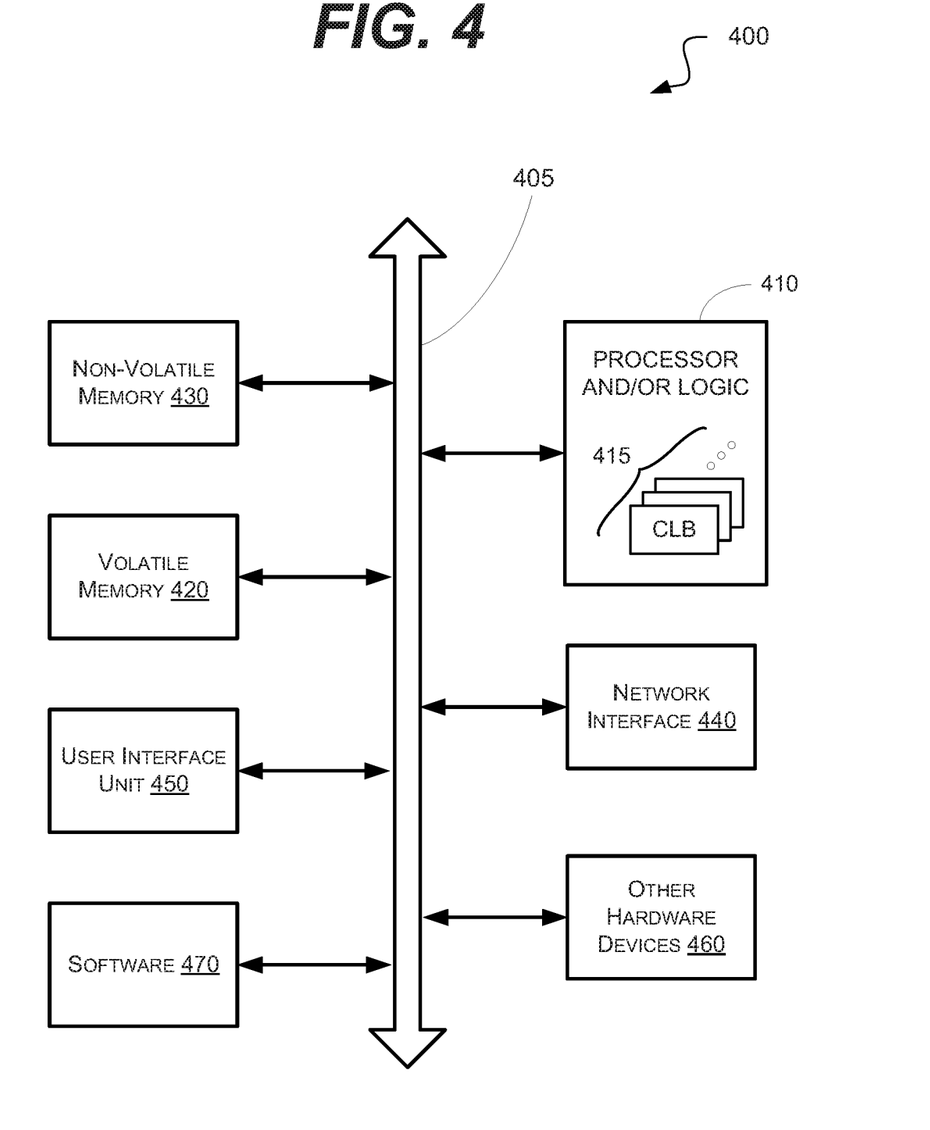
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM)). The information processing system 400 according to the disclosed subject matter may further include a non-volatile memory 430 (e.g., a hard drive, an optical memory, a NAND or Flash memory). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 400 according to the disclosed subject matter may further include a user interface unit 450 (e.g., a display adapter, a haptic interface, a human interface device). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440) of the information processing system 400. In such an embodiment, the information processing system 400 may include one or more native applications, which may be installed locally (e.g., within the non-volatile memory 430) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
a storage memory to store user data in key-value pairs;
at least one snapshot counter configured to store an operation number associated with a snapshot of the key-value pairs, wherein the operation number is a number assigned to a memory operation that results in the storage of a key-value pair; and
a snapshot data structure configured to identify, for at least one key-value pair, a snapshot the key-value pair is associated.

2. The apparatus of claim 1, wherein a modify operation to the storage memory is associated with a sequential operation number; and
wherein the apparatus is configured to, in response to a snapshot creation operation, store an operation number associated with a most recent modify operation in a snapshot counter.

3. The apparatus of claim 2, wherein the snapshot data structure stores, for a key-value pair, a monotonically increasing operation number associated with a modify operation that resulted in the key-value pair being stored.

4. The apparatus of claim 2, wherein the apparatus is configured to, in response to receiving a modify operation associated with a key:
determine a first operation number associated with a most recent key-value pair that includes the key is greater than a second operation number associated with a snapshot; and
mark the most recent key-value pair as invalid and delete-able.

5. The apparatus of claim 1, wherein the apparatus includes a garbage collector circuit configured to delete key-value pairs based, at least in part, upon the snapshot counter and the snapshot data structure; and
wherein the garbage collector circuit is configured to determine that a key-value pair is included in a snapshot, and maintain the key-value pair.

6. The apparatus of claim 5, wherein the snapshot data structure includes a bitmap that indicates that the key-value pair is part of either a snapshot or a most recent version of the key-value pair; and
wherein the garbage collector circuit is configured to determine that the super bitmap indicates that the key-value pair is in use and not delete the key-value pair.

7. The apparatus of claim 1, wherein the snapshot data structure includes a snapshot-specific bitmap that indicates that a key-value pair is associated with a respective snapshot.

8. The apparatus of claim 1, wherein the apparatus is configured to:
maintain a current snapshot that includes the most recent versions of the key-value pairs, and
in response to a write operation, update the current snapshot to include a key-value pair associated with the write operation; and
wherein the snapshot data structure includes a current-snapshot bitmap that indicates that a key-value pair is included in the current snapshot.

9. The apparatus of claim 1, wherein the apparatus is configured to, in response to a snapshot retrieval request for a requested snapshot:
determine, based at least in part upon the snapshot data structure, a key-value air that is associated with the requested snapshot; and
return the key-value pair that is associated with the requested snapshot.

10. An apparatus comprising a storage device, the storage device comprising:
a flash translation layer (FTL) circuit configured to:
cause user data to be stored in key-value pairs, and
associate, upon request, a set of key-value pairs with a snapshot;
a storage memory configured to:
store key-value data pairs, and
store a snapshot data structure that identifies, for at least one key-value pair, a snapshot the key-value pair is associated; and
a snapshot counter configured to store an operation number associated with a snapshot, wherein the operation number is a number assigned to a memory operation that results in the storage of a key-value pair.

11. The apparatus of claim 10, wherein a modify operation to the storage device is associated with an operation number; and
wherein the flash translation layer circuit is configured to, in response to a snapshot creation operation, store an operation number associated with a most recent modify operation in a snapshot counter.

12. The apparatus of claim 11, wherein the snapshot data structure stores an operation number associated with a modify operation that resulted in the key-value pair being stored.

13. The apparatus of claim 11, wherein the flash translation layer circuit is configured to, in response to receiving a modify operation associated with a key:
determine if a first operation number associated with a most recent key-value pair that includes the key is greater than a second operation number associated with a snapshot; and
mark the most recent key-value pair as invalid and delete-able.

14. The apparatus of claim 10, wherein the flash translation layer circuit includes a garbage collector circuit configured to delete key-value pairs based, at least in part, upon the snapshot counter and the snapshot data structure; and
wherein the garbage collector circuit is configured to determine that the super bitmap indicates that the key-value pair is still in use and maintain the key-value pair.

15. The apparatus of claim 14, wherein the snapshot data structure includes a bitmap that indicates that the respective key-value pair is part of a snapshot or a most recent version of the key-value pair; and wherein the garbage collector circuit is configured to determine that the super bitmap indicates that the key-value pair is in use and not delete the key-value pair.

16. The apparatus of claim 10, wherein the snapshot data structure includes a snapshot-specific bitmap that indicates that a key-value pair is included in a respective snapshot.

17. The apparatus of claim 10, wherein the flash translation layer circuit is configured to:
maintain a current snapshot that includes the most recent versions of the key-value pairs, and
in response to a modify operation, update the current snapshot to include a key-value pair associated with the modify operation; and
wherein the snapshot data structure includes a current-snapshot bitmap that indicates that a key-value pair is included in the current snapshot.

18. The apparatus of claim 10, wherein the flash translation layer circuit is configured to, in response to a snapshot retrieval request for a requested snapshot:
determine, based at least in part upon the snapshot data structure, a key-value pair that is associated with the requested snapshot; and
return the key-value pair that is associated with the requested snapshot.

19. A system comprising:
a processor configured to:
write and read user data in key-value pairs, and
manipulate snapshots of sets of the key-value pairs; and
a memory storage device comprising:
a flash translation layer (FTL) circuit configured to:
cause data to be stored in key-value pairs, and
associate, upon request, a set of key-value pairs with a snapshot; and
a storage memory configured to:
store a plurality of key-value data pairs, and
store a snapshot data structure that identifies which snapshot a key-value pair is associated with; and
wherein, in response to the processor requesting the creation of a snapshot:
the flash translation layer (FTL) circuit stores a most recent operation number in a snapshot counter, wherein the operation number is a number assigned to a memory operation; and
the snapshot data structure sets a bitmap for a most recent key-value pair associated with a key in the set of key-value pairs, and wherein the bitmap indicates that the key-value pair may be garbage collected.

20. The system of claim 19, wherein, in response to the processor requesting the deletion of a snapshot:
the snapshot data structure is configured to clear the bitmap a key-value pair associated with the snapshot; and
the flash translation layer circuit is configured to:
determine that the key-value pair is either associated with another snapshot or a most recent version of a key-value pair associated with a respective key, and
delete an operation number associated with the snapshot from the snapshot counter.

* * * * *